Sept. 7, 1954 H. MILLIKEN 2,688,230
CONTINUOUS COMBUSTION ENGINE
Filed Aug. 30, 1950 4 Sheets-Sheet 3

INVENTOR
Humphreys Milliken
by Edward N. Fetherstonhaugh
ATTORNEY

Sept. 7, 1954  H. MILLIKEN  2,688,230
CONTINUOUS COMBUSTION ENGINE
Filed Aug. 30, 1950  4 Sheets-Sheet 4
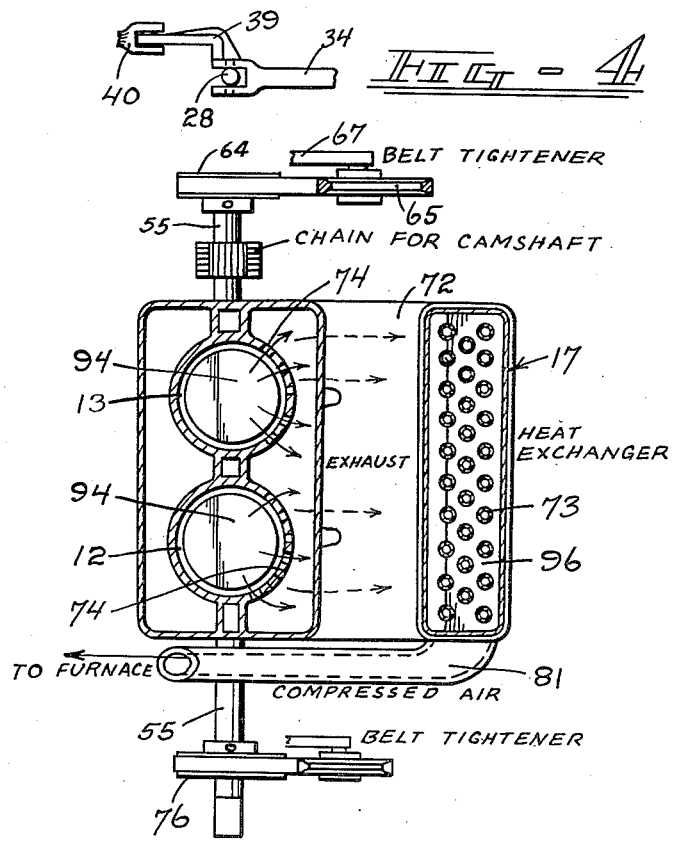
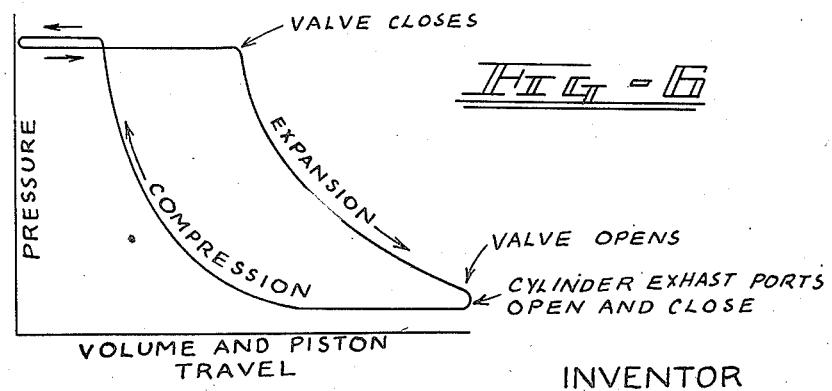
INVENTOR
Humphreys Milliken
by Edward N. Fetherstonhaugh
ATTORNEY Patented Sept. 7, 1954

UNITED STATES PATENT OFFICE 2,688,230

CONTINUOUS COMBUSTION ENGINE

Humphreys Milliken, Mount Royal, Quebec, Canada

Application August 30, 1950, Serial No. 182,235

5 Claims. (Cl. 60—39.63)

The invention relates to improvements in a continuous combustion engine, as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to contrive an engine actuated by combustion products under pressure and in which, the combustion takes place continuously and externally with respect to the cylinders thereof; to furnish an engine having means provided therein for utilizing combustion products of a higher temperature than normally used and therefore resulting in a higher thermal efficiency than that possible in conventional combustion engines; to provide an engine in which coal or other solid fuels may be used; to devise a combustion engine in which the maximum amount of energy will be taken from the fuel; and generally to provide an engine which will be economical and efficient for its purpose.

In the drawings:

Figure 4 is a fragmentary detail showing one of the rocker arm extensions as taken on the line 4—4 in Figure 3.

Figure 5 is a fragmentary plan sectional view through the engine as taken on the line 5—5 in Figure 3.

Figure 6 is a diagrammatic view showing the general features of a typical indicator card of the engine when in operation.

Like numerals of reference indicate corresponding parts in the various figures.

Figure 1:
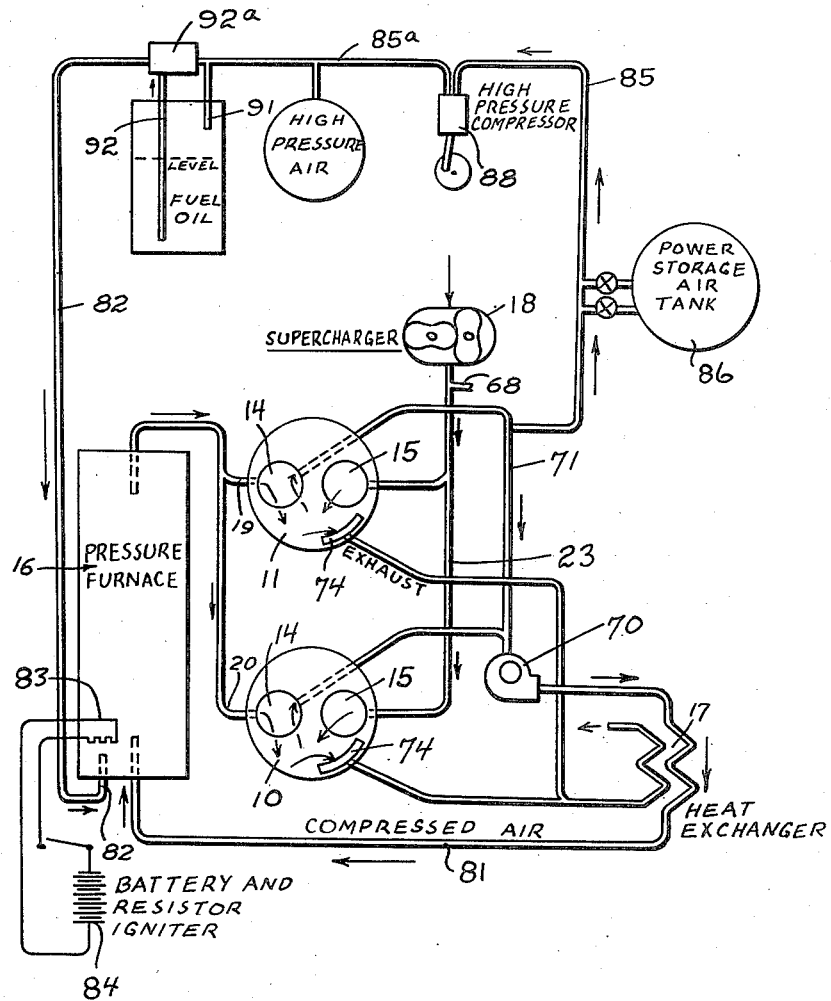
Figure 1 is a diagrammatic view showing the general arrangement of the engine and its accessories.

The invention as hereinafter described may consist of any suitable number of cylinders depending on the power desired and also the use to which the same may be put, however, in this instance, to simplify the explanation thereof the engine has been shown as having two cylinders and with the necessary accessories suitably connected thereto.

Referring to the drawings, the engine illustrated consists of a pair of cylinders as indicated by the numerals 10 and 11 and pistons 12 and 13, respectively, which are slidably fitted within these cylinders. The cylinders 10 and 11 have a cylinder head 21 mounted thereon and valves 14 and 15 are assembled in each cylinder head and the same are inclined at an angle. Each of the ducts 19 and 20 leading from the pressure furnace 16 has a valve 14 located therein. Each of the cylinders is suitably connected to the pressure furnace 16, the heat exchanger 17 and a supercharger 18. The cylinders 10 and 11 are connected to the pressure furnace 16 by the ducts 19 and 20. Each of the valves 15 is located in the duct leading from the supercharger 18 and may be called a cold air inlet valve, and each of the valves 14 is located in the duct leading from the pressure furnace 16 adjacent the cylinder head and may be considered as both an intake and outlet valve, since it permits air from within the cylinder to pass through the ducts and eventually into the pressure furnace, and then these valves 14 permit the re-entry of gases given off by the burning fuel within the pressure furnace.

An intake manifold 23 is connected to the supercharger 18 and to the upper portion of each cylinder through the valves 15 in the cylinder head. The valve seats 24 and 25 are located in the cylinder head 21 and are adapted to be engaged by the valves 14 and 15. The valve seat 24 is located in the cylinder head in each of the passages leading inward from the ducts 19 and 20. The valve steam 28 of each of the valves 14 is slidably fitted in a valve guide 29, which, in turn, is supported by a valve guide mounting 30 and the latter is assembled on the cylinder head. The valve stem 31 of each of the valves 15 is slidably fitted in a valve guide 32 which, in turn, is mounted in the cylinder head.

A vertical plate 33 is mounted on each end of the cylinder head and extends upward thereabove. Rocker arm support rods 33a and 33b are secured in the plates 33 and extend therebetween. Rocker arms 34 are pivotally mounted on the support rod 33a and each is movably connected to the end of the valve stem 28 of the valve 14. These rocker arms 34 are somewhat triangular in shape and a portion thereof which is movably connected to the valve stem 28 is of a forked formation. A roller 35 is rotatably mounted at one corner of each of the triangularly shaped rocker arms 34. A camshift 50 is mounted on the vertical plates 33 and has cams 36 secured thereon which are adapted to engage the rollers 35 while moving the rocker arms 34 in one direction, and a leaf spring 37 is connected to each of the rocker arms near the rollers 35 and adapted to move the rocker arm in the opposite direction to that of the cam 36. In this respect, the cam 36 engages the roller 35 on the rocker arm and pivots that portion thereof outward thereby opening the valve 14 and the leaf spring 37 exerts a pressure against that portion of this rocker arm on which the roller 35 is mounted, thereby acting against the outward movement of this rocker arm and tending to close the valve. An offset arm 39 is connected to the forked portion on each of the rocker arms 34 and extends outward therefrom and has a link 40 pivotally connected to the outer end thereof. This link 40 extends downward and is connected to a "butterfly" type valve 41 which is pivotally supported within the passages in the cylinder head leading from the pressure furnace 16 to each of the cylinders. This "butterfly" type valve 41 is mechanically synchronized with the valve 14 so that it remains closed when the valve itself is closed thereby preventing hot combustion gases from the pressure furnace to penetrate to the vicinity of the valve and accordingly shielding the valve from these gases during approximately half of the operating time of the engine. When the valve 14 is opened the "butterfly" type valve also opens simultaneously thereby permitting these hot combustion gases to enter the cylinder. Each of these "butterfly" type valves 41 is mounted on a stem 42 which extends through a packed gland 43 in the side of the duct 19 and a crank 44 is connected with this stem 42 and the link 40.

Each of the valves 15 is adapted to engage with the valve seat 25 which is located in an opening leading to the intake manifold 23. Each valve stem 31 is connected at the outer end thereof to a rocker arm 46 which, in turn, is pivotally mounted near the center thereof on the rocker support rod 33b. Cams 47 are fixedly mounted on a camshaft 51 and each is adapted to engage a roller 48 on the free end of the rocker arm 46 to force that end of the rocker arm outward thereby moving each of the valve stems inward and accordingly opening the valve. A compression spring 49 encircles the outer portion of each of the valve stems 31 and tends to close the valve 15. The cams 36 and 47 are fixedly mounted on the camshafts 50 and 51, and helical gears 52 and 53, respectively are fixedly mounted on the camshafts towards one end thereof. The camshaft 51 on which the cams 47 and the helical gear 53 are mounted is rotatably supported by the vertical plates 33 which are in turn mounted on the ends of the cylinder head 21 and the position of this camshaft is fixed longitudinally. The camshaft 50 on which the cams 36 and the helical gear 52 are mounted is rotatably and slidably supported by the vertical plates 33 thereby permitting the helical gear 52 to be longitudinally adjusted with respect to the helical gear 53 and accordingly advancing or retarding the cams 36 with respect to the cams 47. As the cams 36 are retarded they permit the valves 14 to remain open for a longer period during each power stroke of the engine thereby allowing a greater volume of hot combustion gases to enter the cylinders and as the cams 36 are advanced the valves 14 remain open for a shorter period of time, and accordingly allowing less of the hot combustion gases to enter the cylinders. The volume and piston travel during the opening and closing of the above-mentioned valves under ordinary circumstances follows a particular pattern during the compression and expansion of the pressure as diagrammatically shown in Figure 6 of the drawings.

A sprocket 54 is fixedly secured on the camshaft 51 and is connected to the crankshaft 55 of the engine by means of a chain drive. A thrust bearing 57 is fixedly secured to the rear end of the camshaft 50 and a pedal and linkage arrangement 58 is secured to this thrust bearing thus providing a means of longitudinally adjusting the position of this camshaft 50 and accordingly advancing or retarding the cams 36 with respect to the cams 47. This pedal arrangement 58 is also connected to a fuel valve 59 on the pressure furnace 16 by means of a link 60 thereby controlling the flow of fuel into the pressure furnace.

The supercharger 18 consists of a casing 63 having positive blower vanes rotatably mounted therein on the shaft 62 and the latter extends outward from this casing. The crankshaft 55 of the engine has a drive pulley 64 fixedly mounted thereon and a belt 65 connects the same with a driven pulley 66 which is fixedly secured on the end of the shaft 62 thereby providing a means of driving the positive blower. A belt tightener 67 is adapted to engage the belt 65 thereby effecting a positive driven action between the crank shaft 55 and the blower shaft 62. Air is taken into the supercharger through one side thereof and then forced into the cylinders through the intake manifold 23 which is connected to the supercharger and to each of the cylinders. An extension duct 68 is connected to the intake manifold 23 and has a check valve 69 fitted therein, thus permitting air to be drawn into the intake manifold and cylinders at times when the supercharger is shut down for the purpose hereinafter described.

Several exhaust ports 74 are located in each of the cylinder walls and are suitably located so that when the piston reaches a point near the bottom of its stroke these exhaust ports are uncovered thereby permitting the spent gases to escape therethrough into an exhaust duct 72.

A circulator 70 is connected to the cylinder head by means of a duct arrangement 71 and is adapted to draw air from the cylinders and force it through the heat exchanger 17 and furnace 16. This heat exchanger consists of a plurality of tubes 73 and baffles 96 suitably located between a number of these tubes through which the air is forced downward from the circulator and the air is then forced upward through a duct 81 to the pressure furnace 16 where it is mixed with fuel and ignited, and these gases created thereby pass through the ducts 19 and 20 to enter the cylinders. The exhaust duct 72 is connected with each of the cylinders and with the heat exchanger and as the hot gases pass therethrough and escape therefrom the air passing downward in the heat exchanger is heated.

The circulator 70 is connected to an electric motor 75 which is used when starting the engine and when the same has been started the circulator is driven by the crankshaft. In this instance, a pulley 76 is fixedly secured on the crankshaft and a belt 77 connects the same with a pulley 78 on the circulator shaft 79.

The circulator 70 is adapted to circulate the compressed air at the same rate at which it is compressed by the engine; therefore only a negligible quantity of combustion products is drawn into the circulator and associated ducts. Should a relatively small portion of combustion products be mixed with the compressed air delivered to the furnace, it would not be objectional, as there would always be a large excess of oxygen above that required for combustion in the furnace.

The pressure furnace 16 consists of a cylindrical casing 80 which is closed on both ends thereof and the ducts 19, 20, and 81 are connected to this pressure furnace. A fuel feed line 82 is connected to one end of the pressure furnace 16 and the fuel valve 59 in this fuel feed line regulates the rate of feeding fuel into the furnace. A resistor igniter 83 extends into the pressure furnace adjacent the inlet and is connected to an electric battery 84.

An air line 85 is connected to the duct 71 leading to the circulator 70 and a portion of the air coming through the duct 71 enters the air line 85. A high pressure booster compressor 88 is connected to the air line 85 boosting the air pressure in duct 85a to which is connected an air tank 89. The connecting rod 90 of the high pressure compressor 88 is suitably connected to the crankshaft 55 to be actuated by the rotation of the latter. An air pipe 91 is connected to the air line 85a and extends into the fuel tank 87 and projects a short distance below the top thereof. The air line 85a has an injector thereon just past the air pipe 91 and a fuel pipe 92 extends downward from this injector into the fuel tank 97 and terminates a short distance from the bottom thereof. The air pipe 91 carries a high pressure of air into the fuel tank 87 thereby forcing fuel from the tank up through the fuel pipe 92 and into the injector on the air line 85. The pressure of air on the fuel in tank 87 forces fuel out through duct 92 into injector 92a. Air from line 85a passes through the injector thereby mixing the fuel and air into an inflammable gas which is fed into the pressure furnace 16.

The valves 14 and 15 are inclined at an angle in order to permit a larger diameter of valve with a greater area of valve opening, permitting higher engine speed and velocity of air and gases through the valves, without serious pneumatic friction and loss in pressure in flowing through the valve opening. This arrangement of valves leaves a pyramidal space just above the cylinder which is occupied by a filler 94 formed on the top of the piston. The sides of the filler 94 are inclined towards the apex forming a pyramidal shape, coinciding to the shape of the space which the filler is adapted to fill. The particular shape of this filler 94 permits the rush of air from the valve 15 to pass around the filler on all sides thereof, thereby thoroughly purging the cylinder of the hot spent gases and permitting them to escape through the exhaust ports 74. The shape of the filler 94 coincides with the upper portion of the cylinder within the cylinder head. Each of the pistons 12 is connected to the crankshaft 55 by means of connecting rods 95.

In the operation of the invention, exhaust ports 74 in the cylinder wall are exposed or uncovered as the piston reaches a position about 45° from bottom dead center. On opening of parts 74 the spent combustion products, being still above the atmospheric pressure, blow out to atmosphere through heat exchanger 17. Slightly thereafter the air inlet valve is opened by the cam 47 which is mechanically synchronized with the piston travel, admitting cold air from the atmosphere pumped in by the supercharger 18 which is driven from the engine crankshaft. Simultaneously the residue of spent combustion products in the cylinder is blown out through the exhaust ports leaving the cylinder filled with cold air. As the piston moves upward closing the exhaust ports, the valve 15 closes and the piston compresses the cold air trapped in the cylinder.

When the pressure in the cylinder has thus been raised to slightly above the pressure on the opposite side of the valve 14, the latter is opened by this excess pressure thereby overcoming the leaf spring 37. Immediately thereafter the cam 36 opens this valve 14 further and holds it wide open. This wide opening of the valve minimizes the pneumatic friction and loss of pressure in pushing the compressed air through the valve against the closing action of the spring. The continuing upward motion of the piston then forces compressed air out of the cylinder at a constant pressure through the valve 14 and into the air duct to the circulator 70. The circulator thence circulates the compressed air through the heat exchanger 17 and the duct 81 to the oil fired pressure furnace 16, thence through the ducts 19 and 20 which lead back to the valve 14, thereby completing the circuit. The "butterfly" type valve 41 is mechanically synchronized with the valve 14 and when the same is opened the valve 41 is opened, and of course, this "butterfly" type valve is closed when the valve 14 is closed, as previously described herein.

As the piston passes by the top dead center position within either of the cylinders the cam 36 holds the valve 14 open admitting the hot combustion products into the cylinder thereby driving the piston down for a working stroke.

In this manner the engine operates on a two-stroke cycle, with each cylinder making a working stroke in each revolution. The valve 15 is opened by the cam 47 when the crankshaft is approximately 30 degrees before bottom center and the valve 15 is not closed until after exhaust ports 74 are closed by the piston. The vertical component of motion of the crank and piston, through this 75 degree rotation is a small proportion of the total travel of the piston and accordingly there is relatively small sacrifice of power thus involved.

The duration of the opening of valve 15 is adjusted so that practically all of the hot gases are driven out of the cylinders and only negligible portions of cold air pass out through the exhaust port 74 into the heat exchanger 17, therefore there is only a small sacrifice of thermal efficiency in the purging operation.

The passage of hot gases through the valve 14 into the cylinder is followed by the passage of relatively cool compressed air through this valve in the reverse direction thus maintaining the temperature of the valve well below that of the hot combustion products.

In general with combustion engines, the maximum permissible temperature of valves limits the maximum permissible power output of the engine. It will be noted from the foregoing that the dual function of the valve 14 permits the use of combustion products of higher temperature than would otherwise be permissible. Thus the dual function arrangement of the valve 14 adds substantially to the power output and thermal efficiency of the engine.

It will be noted, that only the cool air from the supercharger 18 passes through the valve 15. The underside of the valve 15 is contacted alternatively by the combustion products and then by the relatively cool air compressed by the piston.

When the air in the cylinder has been compressed by the piston to a pressure slightly higher than that in the ducts leading from the pressure furnace to the valve 14 and also the duct leading from the valve 14 to the heat exchanger, the valve 14 opens against the laminated or leaf spring 37, while the compressed air is pushed therethrough into the duct leading to the heat exchanger and into the duct leading to the pressure furnace. After the piston passes to the top center position, the valve 14 is held wide open by the cam 36 admitting the combustion products into the cylinder and pushing the piston downward on its working stroke, until it reaches a predetermined point in its travel, when the valve 14 is closed by the cam.

The instant of closing of the valve 14 is made adjustable while the engine is running and carrying its load. This control of the cut-off is accomplished by the use of the helical gears 52 and 53 in which one is longitudinally adjustable with respect to the other during the time that the engine is running and which will advance or retard the cam 36 in relation to the piston position. An alternative means of accomplishing the foregoing with regard to advancing or retarding the cam 36 may be accomplished by providing the cam 36 with a tapered profile, thereby varying the duration of engagement with the roller on the rocker arm.

In starting from standstill, it is important to have maximum starting torque which is obtained by shifting the cut-off to the full stroke of the piston. As the speed increases the operator shortens the duration of admission of combustion products, thus the duration of the expansion increases, permitting the use of the combustion products with maximum efficiency.

Figure 2:
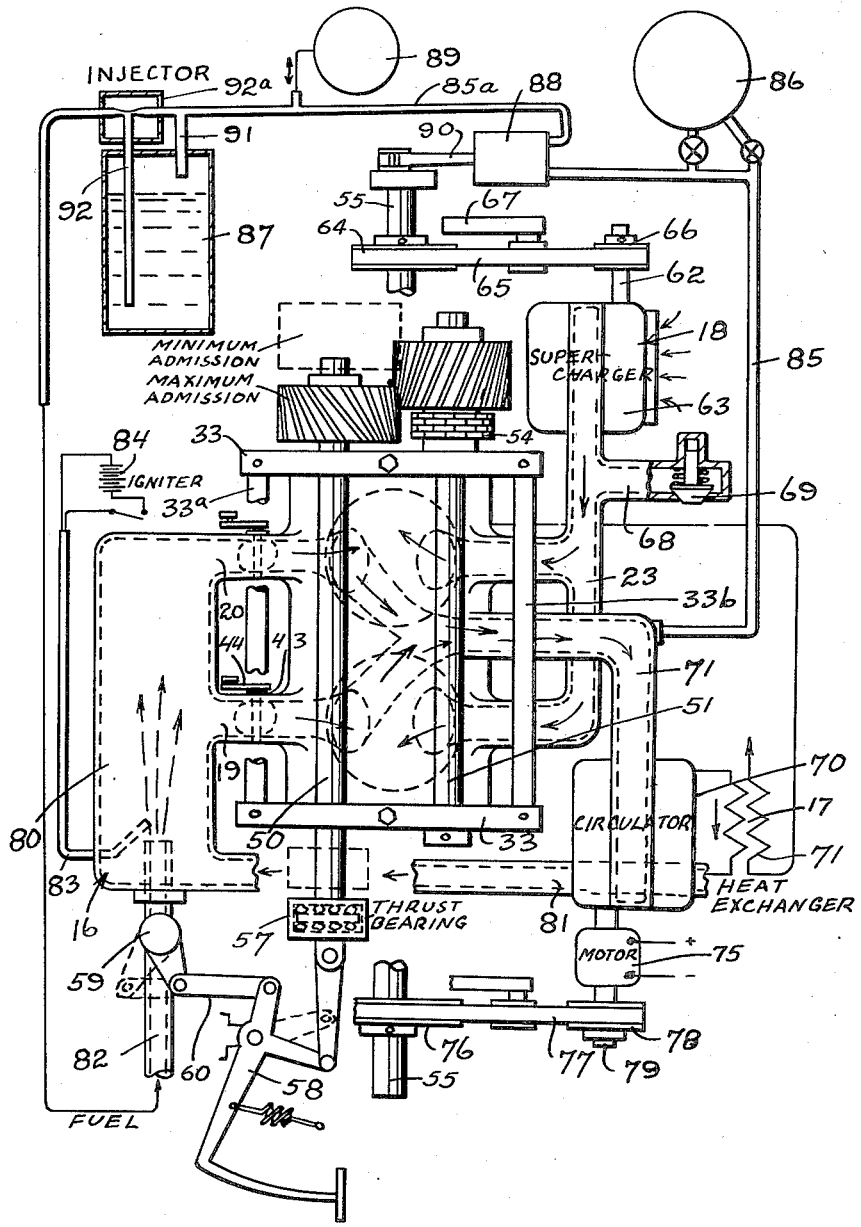
Figure 2 is a diagrammatic view with parts of the engine omitted and showing the accessories connected thereto.
Figure 3:
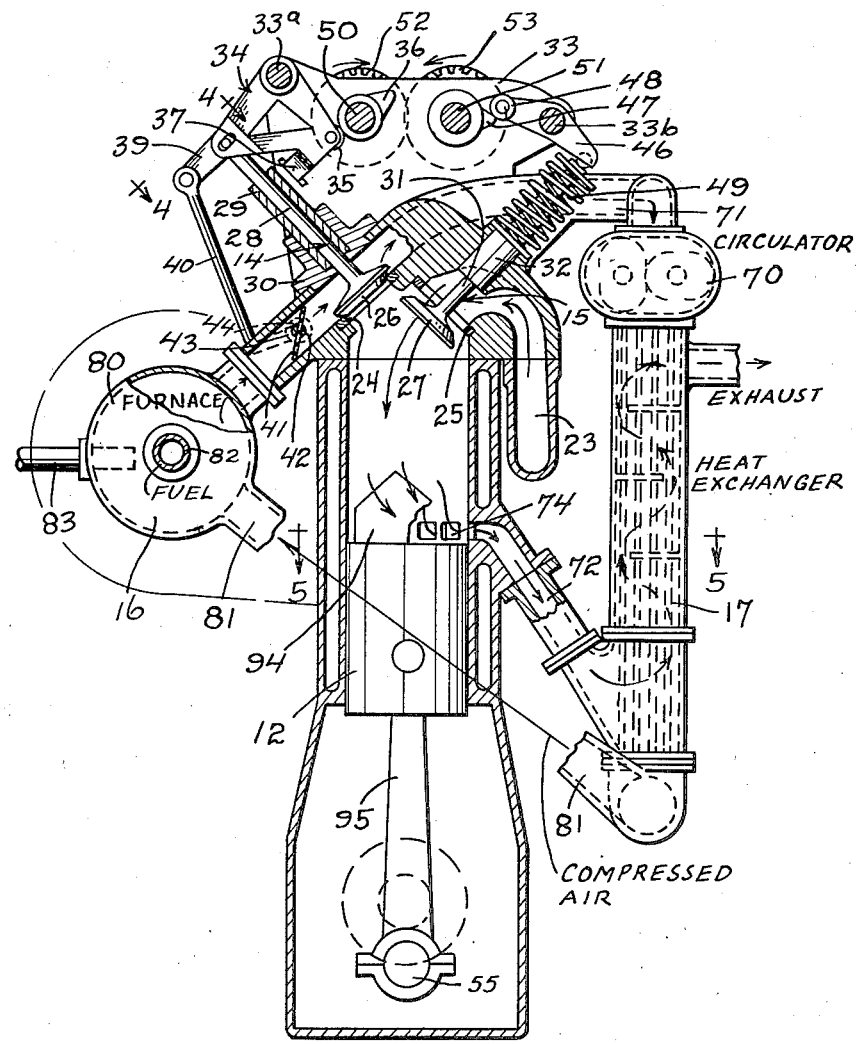
Figure 3 is a vertical sectional view through one of the cylinders of the engine.

While the rate of fuel burning is held constant, with constant engine speed, the weight of air drawn into the cylinder in a unit of time and compressed, will be a fixed quantity. The compressed air, in passing through the heat exchanger and furnace will have its volume increased with a certain ratio in proportion with the quantity of fuel burned, which is assumed to be fixed. In this respect, it will be seen that in changing the cut-off to take a greater volume of combustion products into the cylinder will require a greater volume of compressed air passed through the cylinder from the valve 15 which will require a lower pressure (the weight of air per unit of time being assumed fixed). To offset this reduced pressure, the operator will increase the rate of fuel burning at the same time that he lengthens the duration of the admission to the cylinder in order to obtain maximum starting torque of the engine. Conversely, as the speed increases, the operator will shorten the duration of admission and reduce the rate of fuel burning, thus holding the pressure in the ducts and furnace approximately constant. This simultaneous change of fuel input and admission to the cylinder is obtained by the mechanism illustrated in Figure 2 of the drawings.

When the engine has been standing idle for some time, and no fuel has been burned, all parts of the engine are cold, and to start the same the circulating blower is turned on. At this time the circulating blower is driven by an electric motor and circulates air through the furnace where it is heated, and as the volume of the furnace and ducts with air therein is relatively small, the pressure rises quickly and the engine is started without load as the clutch is out. The engine itself drives the supercharger pumping air into the cylinder where it is compressed, thus quickly building up the pressure and rendering the engine ready to develop power when the clutch is let in. The high pressure compressor 88 may also be started by an electric motor 97 in the same way as that of the circulating blower and then shifted over to be driven by the engine after the same is running. The power storage air tank 86 may be utilized on engines, propelling vehicles, and in coasting down hill the kinetic energy of the vehicle may be converted into potential energy by pumping air into this power storage air tank from the engine. In pumping air into this power storage tank the cut-off is advanced thereby shortening admission to zero as hereinbefore described, and at the same time shutting off the fuel. In this respect, the engine draws in air and compresses it, but no air passes through the valve 14 into the cylinder, hence the pistons are not driven, but retarded by the work of compressing air. At the same time the supercharger is stopped by slackening the belt driving the same and air is drawn into the cylinder through the check valve 69 and the valve 15 which is open by the suction of the piston and held open until the piston covers the exhaust ports.

It will be seen from the foregoing that when pressure builds up in the ducts and pressure furnace it backs up into the power storage air tank 86. The power thus stored can be used to assist the furnace in supplying an excess volume of compressed air to drive the engine for short periods when extra power is desired.

It will also be seen that coal or other solid fuel may be used instead of liquid fuel to heat the compressed air and increase its volume. For this purpose the coal may be burned in a furnace at atmospheric pressure transferring its heat to the compressed air which passes through the tubes in the furnace. Such arrangement would be advantageous for propelling railway locomotives.

What I claim is:

1. An engine having a cylinder, a piston therein, a crankshaft, a crank thereon, a connecting rod engaging said piston, exhaust ports in the wall of said cylinder, located at points such that said ports are uncovered and opened by said piston when said piston is near the crank-end of its travel, a cylinder-head on said cylinder, an air-inlet valve in said head, an air-blower, an air duct conveying air from said blower to said air-inlet valve, a mechanism for opening said air inlet valve when said piston uncovers said exhaust ports, said mechanism closing said air-inlet valve when said ports are closed by said piston, a dual-function valve in said cylinder head and being spring-biased to closed position, and said dual-function valve being opened by pressure of air in said cylinder when compressed by said piston, synchronized mechanism for closing said dual-function valve before said piston reaches the crank-end of its stroke, said mechanism for operating said air-inlet valve and said dual-function valve being driven from said crankshaft, and said mechanism for operating said dual-function valve having means for changing the timing of said dual-function valve while the engine is in operation, said mechanism for operating said air inlet valve consisting of a camshaft and a cam mounted on said camshaft, and said mechanism for operating said dual-function valve consisting of a second camshaft and a cam mounted on said second camshaft, a pair of spur-gears having helical teeth and connecting said first-mentioned camshaft with said second-mentioned camshaft for driving the latter, and means for sliding one of said spur-gears along its axis of rotation while in operation for altering the relative timing of said camshafts with respect to one another, an air duct connecting said dual-function valve to the inlet end of an air-heater, an air duct connecting the outlet of said air-heater with said dual-function valve, means for circulating air from said dual-function valve through said air heater to said dual-function valve.

2. An engine having a cylinder, a piston therein, a crankshaft, a crank thereon, a connecting rod engaging said piston, exhaust ports in the wall of said cylinder, located at points such that said ports are uncovered and opened by said piston when said piston is near the crank-end of its travel, a cylinder-head on said cylinder, an air-inlet valve in said head, an air-blower, an air duct conveying air from said blower to said air-inlet valve, a mechanism for opening said air-inlet valve while said exhaust ports are uncovered, said mechanism closing said air-inlet valve when said ports are closed, a dual-function valve in said cylinder head, a spring biasing said dual-function valve toward said cylinder to closed position, said dual-function valve being opened away from said cylinder by pressure of air in said cylinder when compressed by said piston, said spring biasing said valve with a force less than the force of the air pressure, synchronized mechanism for closing said dual-function valve before said piston reaches the crank-end of its stroke, said mechanism for operating said air-inlet valve and said dual-function valve being driven from said crankshaft, an air-heater, having an air-inlet and an outlet, an air duct connecting said dual-function valve to the air-inlet of said air-heater, an air-duct connecting the outlet of said air-heater with said dual-function valve, and means for circulating air from said dual-function valve through said air-heater to said dual-function valve.

3. An engine having a cylinder, a piston therein, a crankshaft, a crank thereon, a connecting rod engaging said piston, exhaust ports in the wall of said cylinder, located at points such that said ports are uncovered and opened by said piston when said piston is near the crank-end of its travel, a cylinder-head on said cylinder, an air-inlet valve in said head, an air-blower, an air-duct conveying air from said blower to said air-inlet valve, a mechanism for opening said air-inlet valve while said exhaust ports are uncovered, said mechanism closing said air-inlet valve when said ports are closed by said piston, a dual-function valve in said cylinder head, a spring biasing said dual-function valve toward said cylinder to closed position, said dual-function valve being opened away from said cylinder by pressure of air in said cylinder when compressed by said piston, said spring biasing said valve with a force less than the force of the air pressure, synchronized mechanism for closing said dual-function valve before said piston reaches the crank-end of its stroke, said mechanism for operating said air-inlet valve and said dual-function valve being driven from said crankshaft, said mechanism for operating said air inlet valve comprising a camshaft, a cam mounted on said camshaft, and said mechanism for operating said dual-function valve comprising a second camshaft and a cam mounted on said second camshaft, an air-heater having an air-inlet and an outlet, an air duct connecting said dual-function valve to the air-inlet of said air-heater, an air duct connecting the outlet of said air-heater with said dual-function valve, and means for circulating air from said dual-function valve through said air-heater to said dual-function valve.

4. An engine having a cylinder, a piston therein, a crankshaft, a crank thereon, a connecting rod engaging said piston, exhaust ports in the wall of said cylinder, located at points such that said ports are uncovered and opened by said piston when said piston is near the crank-end of its travel, a cylinder-head on said cylinder, an air-inlet valve in said head, an air-blower, an air duct conveying air from said blower to said air-inlet valve, a mechanism for opening said air inlet valve while said exhaust ports are uncovered, said mechanism closing said air-inlet valve when said ports are closed by said piston, a dual-function valve in said cylinder head, a spring biasing said dual-function valve toward said cylinder to closed position, said dual-function valve being opened away from said cylinder by pressure of air in said cylinder when compressed by said piston, said spring biasing said valve with a force less than the force of the air pressure, synchronized mechanism for closing said dual-function valve before said piston reaches the crank-end of its stroke, said mechanism for operating said air-inlet valve and said dual-function valve being driven from said crankshaft, said mechanism for operating said air inlet valve comprising a camshaft and a cam mounted on said camshaft, and said mechanism for operating said dual-function valve comprising a second camshaft and a cam mounted on said second camshaft, a heat-exchanger having an air-inlet, an air-outlet, a combustion-products inlet and a combustion-products outlet, an air duct connecting said dual-function valve to the air-inlet of said heat-exchanger, an air-heater having an air-inlet and an outlet, an air-duct connecting the air-outlet of said heat-exchanger with the air-inlet of said air-heater, and an air duct connecting the outlet of said air-heater with said dual-function valve.

5. An engine according to claim 4, wherein a duct is provided connecting said exhaust ports to the combustion-products-inlet of said heat-exchanger.

References Cited in the file of this patent

UNITED STATES PATENTS

| Number | Name | Date |
| --- | --- | --- |
| 2,063,362 | Barkey | Dec. 8, 1936 |
| 2,211,013 | Hosterman | Aug. 13, 1940 |
| 2,408,448 | Rossman | Oct. 1, 1946 |
| 2,459,447 | Milliken | Jan. 18, 1949 |

FOREIGN PATENTS

| Number | Country | Date |
| --- | --- | --- |
| 190,297 | Germany | Oct. 21, 1907 |
| 239,434 | Great Britain | Sept. 10, 1925 |
| 496,692 | France | Aug. 12, 1919 |
| 675,693 | France | Feb. 13, 1930 |